United States Patent [19]

Lux, Jr.

[11] E Re. 31,134

[45] Reissued Jan. 25, 1983

Best Available Copy

[54] GROUND LEVEL TRANSFORMER UNIT

[75] Inventor: Robert J. Lux, Jr., Broken Arrow, Okla.

[73] Assignee: Thermodynamics Corporation, Broken Arrow, Okla.

[21] Appl. No.: 218,659

[22] Filed: Dec. 22, 1980

Related U.S. Patent Documents

Reissue of:

[64] Patent No.: 4,213,111
Issued: Jul. 15, 1980
Appl. No.: 937,517
Filed: Aug. 28, 1978

[51] Int. Cl.[3] ..... H01F 15/02

[52] U.S. Cl. ..... 336/65; 52/20; 174/38; 248/679

[58] Field of Search ..... 361/334, 335, 332, 333, 361/418; 174/37, 38, 48; 307/17; 248/678, 679, 346; 336/65; 52/20, 292, 294; 362/431

[56] References Cited

U.S. PATENT DOCUMENTS

| | | | |
|---|---|---|---|
| 342,552 | 5/1886 | Westinghouse, Jr. | 174/38 X |
| 1,266,152 | 5/1918 | Poole | 362/431 X |
| 2,808,135 | 10/1957 | Moran | 174/44 X |
| 3,286,133 | 11/1966 | Sturdivan | 174/38 |
| 3,341,718 | 9/1967 | Acker | 174/38 X |
| 3,450,945 | 6/1969 | Wurdack | 174/37 X |
| 3,466,379 | 9/1969 | Lohman | 174/38 |
| 3,812,279 | 5/1974 | Vogeli | 174/38 |
| 3,938,285 | 2/1976 | Gilbu | 52/20 |
| 3,962,660 | 6/1976 | Duckett | 336/65 |
| 4,089,139 | 5/1978 | Moffa et al. | 52/20 |

FOREIGN PATENT DOCUMENTS

| | | | |
|---|---|---|---|
| 1948061 | 3/1971 | Fed. Rep. of Germany | 174/38 |
| 2053910 | 5/1972 | Fed. Rep. of Germany | 174/38 |
| 704591 | 4/1966 | Italy | 174/48 |
| 1503056 | 3/1978 | United Kingdom | 174/38 |
| 194906 | 8/1967 | U.S.S.R. | 361/332 |

*Primary Examiner*—Thomas J. Kozma
*Attorney, Agent, or Firm*—Head, Johnson & Stevenson

[57] ABSTRACT

A transformer unit comprising a transformer, a ground level base pad having a vertical cable opening therethrough, and an open top, open bottom vertical cable vault situated in the earth, the upper end thereof being received in the pad opening to provide easy access to and training room for underground electrical cables connected to the transformer.

5 Claims, 9 Drawing Figures

GROUND LEVEL TRANSFORMER UNIT

Matter enclosed in heavy brackets [ ] appears in the original patent but forms no part of this reissue specification; matter printed in italics indicates the additions made by reissue.

BACKGROUND OF THE INVENTION

1. Field of the Invention

This invention lies in the field of ground level mounted transformers. It is particularly related to means to provide easy access and greater training room for electrical cables connected to a ground level mounted transformer and to provide protection against damage to cables during site construction.

2. Prior Art

Ground level transformers are commonly mounted on pads. Generally the transformer pads have an opening to receive underground electrical conductors or cables therethrough to connect to the transformer. When cables protrude from the ground and through the opening in a pad, little vertical space is available for maneuvering of the cables. Also, after the cables have been installed in the earth and before a transformer is placed in position, great possibilities exist for vandalism or accidental damage to the cables during site construction.

An additional problem with transformers mounted on ground level pads is that during cold weather, ground freezing causes the pads to be pushed upwardly, sometimes referred to as frost heave. If cables from underground are tautly connected to a transformer, the upward movement of the pad and transformer can snap off the porcelain insulators to which the cables are connected.

Examples of transformer pads for ground level mounted transformers are disclosed in U.S. Pat. Nos. 4,050,659; 3,962,660; 3,841,032; and 4,056,251.

SUMMARY OF THE INVENTION

The present invention provides means to overcome the foregoing disadvantages. It is an object of the invention to provide the combination of a transformer, a pad, and a housing or vault for electrical cables to be connected to the transformer, thereby providing easy access to the cables and greater training room therefor.

Another important object of the present invention is to protect electrical cables, once they are situated at a transformer site, against vandalism and accidental damage before the transformer base pad and transformer are placed in position.

The invention comprises a vault used in conjunction with a transformer pad and ground level transformer, the transformer pad having an opening therethrough to receive underground electrical cables, the vault being situated below the ground level and comprising a hollow, open top, open bottom rigid structure. The upper end of the cable vault is dimensioned to be received in the transformer pad opening. The lower end of the cable vault may be straight or it may be canted at an angle with respect to a vertical plane to facilitate entry of cables.

The upper end of the cable vault may be provided with a removable cover. The cover is removed when a transformer pad and the transformer are placed in position over the vault, but serves to protect cables in the vault until the transformer and pad are installed.

BRIEF DESCRIPTION OF THE DRAWINGS

These and other objects and advantages together with the function of the invention may be better understood by reference to the following detailed description and the drawings, wherein.

DETAILED DESCRIPTION

Figure 1:
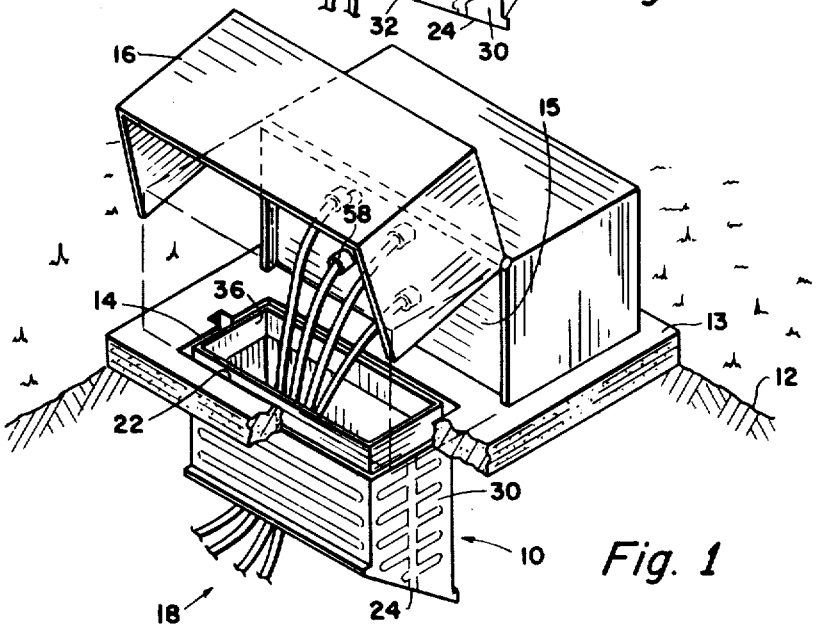
FIG. 1 is a perspective view, shown partially cutaway, of a unit, including the transformer, the pad, and the cable vault, embodying the present invention in an operative environment.

Referring to the drawings and particularly to FIG. 1, reference character 10 generally indicates a cable vault positioned in the earth and mostly below the ground level 12. A transformer pad 13 is situated above the cable vault 10, the transformer pad having an opening 14 therethrough to receive the upper portion of the cable vault. A transformer 15 rests on top of the transformer pad 13. A cover 16 is hinged to the transformer 15 and covers the conductors connected to the transformer. In some cases cover 16 may not be hinged but may be slid up and down into and out of position.

Figure 4:
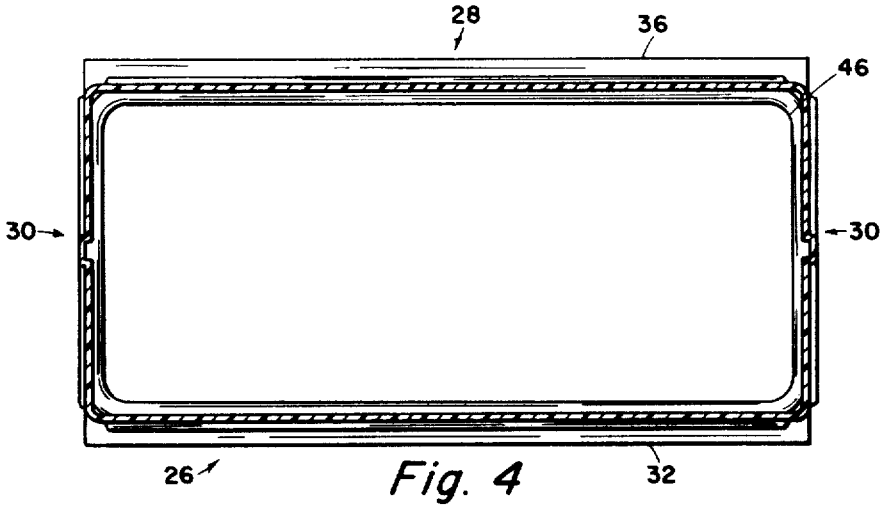
FIG. 4 is a sectional view taken along A—A of FIG. 3.
Figure 2:
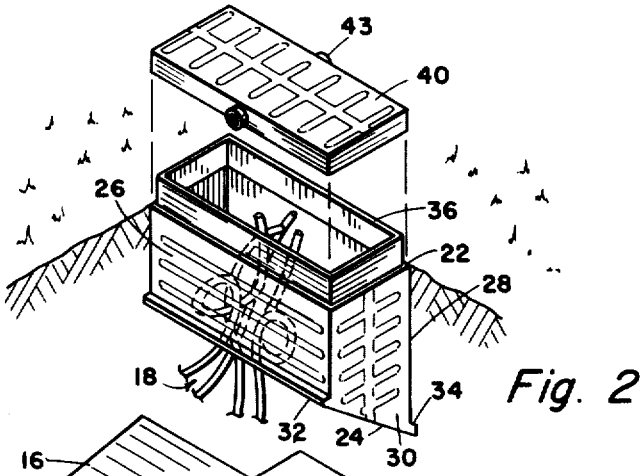
FIG. 2 is a perspective view of a cable vault of the present invention secured in position in the earth and showing how the cover is positioned.
Figure 3:
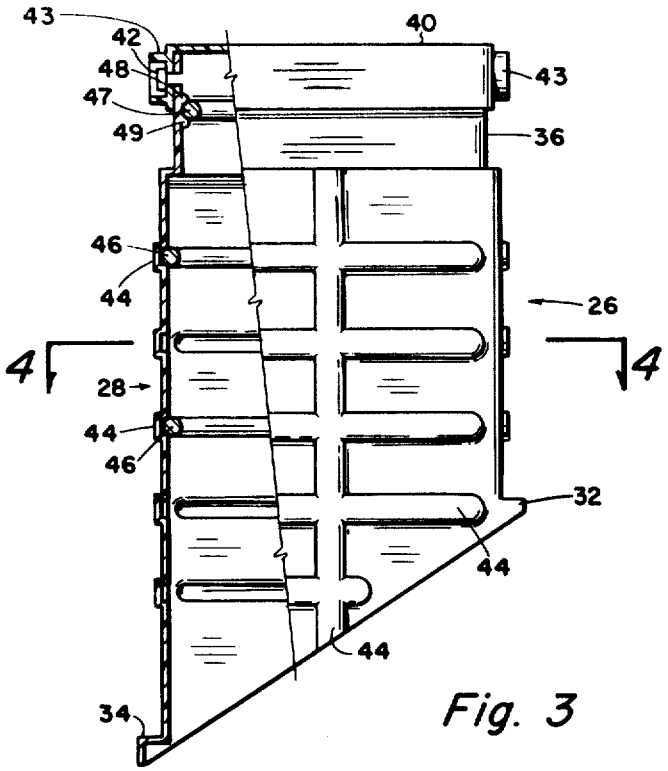
FIG. 3 is a side elevational view, partly sectional, illustrating the configuration of one embodiment of a cable vault.

The cable vault 10 comprises an upright hollow body having an upper open upper end 22, and open lower end 24, a front 26, a rear 28, and sides 30 (see FIGS. 2, 3, and 4). The lower end 24 is canted from the front 26 to the rear 28, at an angle, preferably 45 degrees, with respect to a vertical plane, or to the plane of the front portion 26. Underground cables 18 enter the cable vault 10 at the lower end 24 of the front portion 26, and it will be apparent that the canted configuration of end 24 facilitates the entry of the cables 18 into the cable vault.

An outwardly projecting ridge 32 (see FIG. 3) is provided at the lower edge of the front 26. Similarly, a ridge 34 is provided along the length of the lower end of the rear portion 28. The ridges 32 and 34 provide anchoring means to better secure the cable vault 10 when it is in position below the ground surface 12 and as reinforcing to stiffen the cable vault to thereby better enable it to resist collapse as dirt is compacted around it.

The upper end of the cable vault 10 is dimensioned to be received in the transformer pad opening 14. This is accomplished as shown in FIG. 2 by providing an upwardly projecting collar 36, properly dimensioned to fit in the transformer pad opening 14. The collar 36 is formed by a horizontal upwardly extension of the upper portions of the front 26, rear 28, and sides 30.

A cover 40 (see FIGS. 2, 3, and 5) is dimensioned to receive the upper end of collar 36. Tamper-proof means are provided on the cover member 40 to attach it to the upper end of the vault. The illustrated tamper-proof means is a bolt having a pentagonal head received in a tubular integrally extending boss 43. Bolt 42 thus requires a special socket to remove it and to thereby remove lid 40.

When the cable vault 10 is positioned in place in the earth at the site of a transformer location, the collar 40 protrudes upwardly above the earth's surface. Incoming cable ends 18 are housed within the cable vault 10, and the cover member 40 provides protection against vandalism or accidental damage to the cables. The cover member 40 is removed when the transformer pad 13 and the transformer 15 are placed in position.

Figure 5:
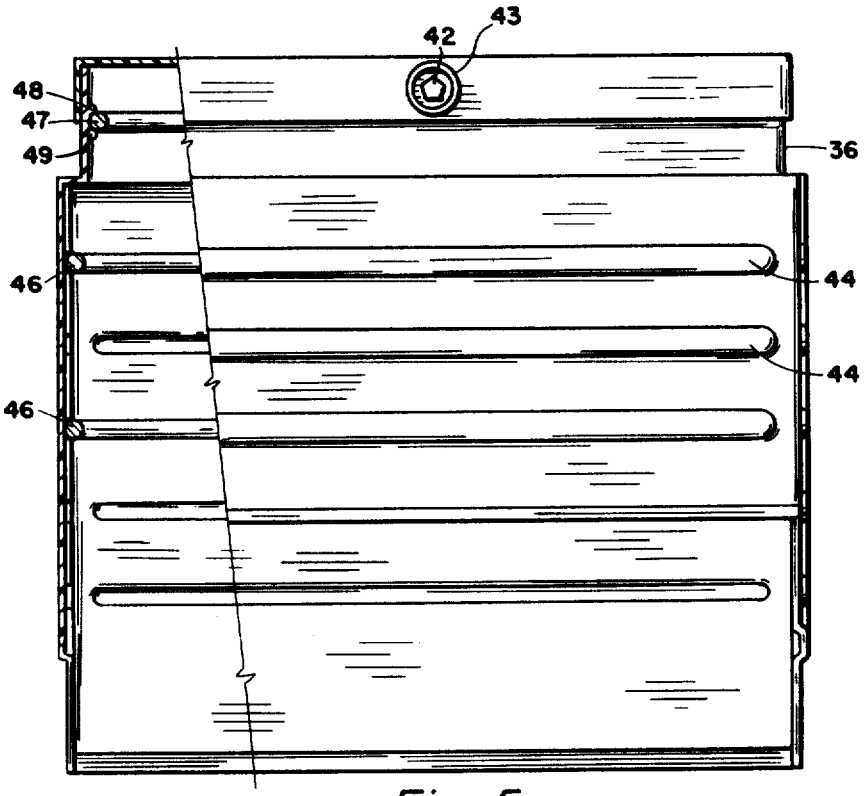
FIG. 5 is a frontal elevational view, partly in section, of the cable vault.

The cable vault is preferably made of lightweight, non-conduction material, such as plastic or fiberglass. To increase the strength of the cable vault 10 and prevent collapse after it is positioned in the earth, a plurality of strengthening ribs 44 are provided on the front 26, rear 28, sides 30. The strengthening ribs 44 are made by outwardly deforming portions of the cable vault 10. The position of the strengthening ribs 44 may vary. As shown in FIGS. 2 and 5, horizontal ribs are employed on the front portion 26 and the rear portion 28; a combination of horizontal and vertical ribs are employed on the sides 30.

The cable vault 10 may be provided with additional strengthening devices. FIGS. 3, 4, and 5 show the use of metallic rods 46, each formed as a rectangular loop having outer dimensions slightly greater than the normal inner dimensions of the cable vault 10, but less than the dimensions of ribs 44. Upper rectangular loop 47 is positioned in the interior of the collar portion 36 and is retained in position by integral inwardly extending bosses 48.

Figure 6:
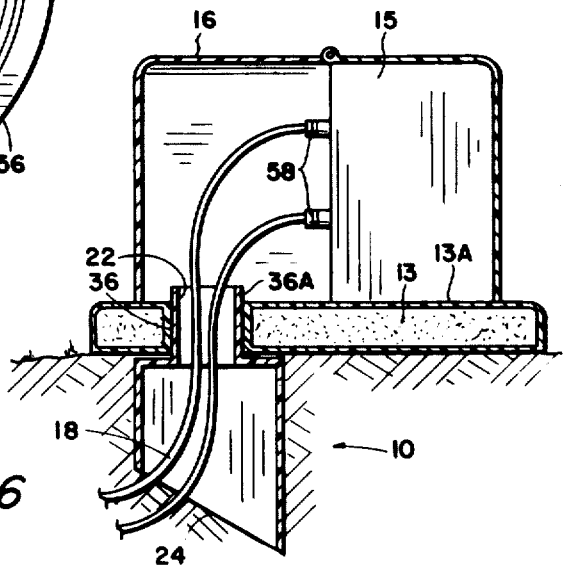
FIG. 6 is a cross-sectional view of a transformer mounted on a transformer pad on the earth's surface and showing a cable vault in which the upper end extends above the top surface of the pad.

FIG. 6 is a cross-sectional view of a transformer pad, transformer and cable vault mounted in position. The length of the vault collar portion 36 which extends upwardly and is received in the opening 22 in transformer pad 13 is greater than the thickness of the pad so that a portion 36A extends well above the transformer pad upper surface 13A. The upwardly extending vault collar portion 36A serves to restrict tampering by items that might be forced under the lower edge of the transformer 15 or transformer cover 16.

Figure 9:
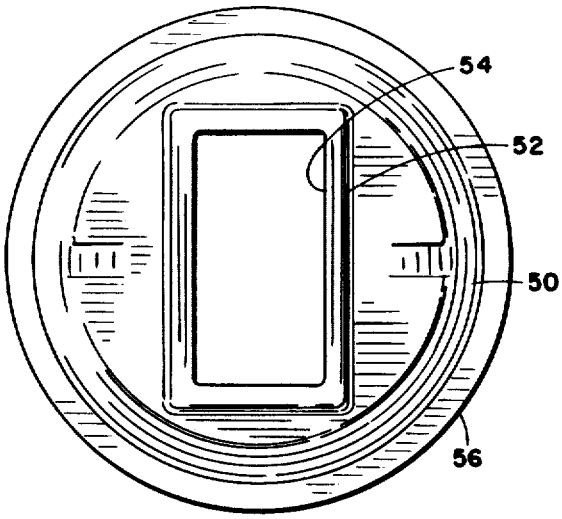
FIG. 9 is a top view of the embodiment of FIGS. 7 and 8.
Figure 8:
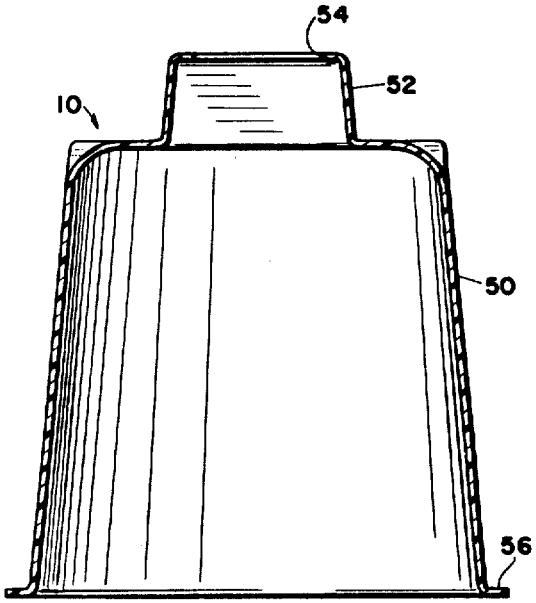
FIG. 8 is a cross-sectional view taken along the line 8—8 of FIG. 7.
Figure 7:
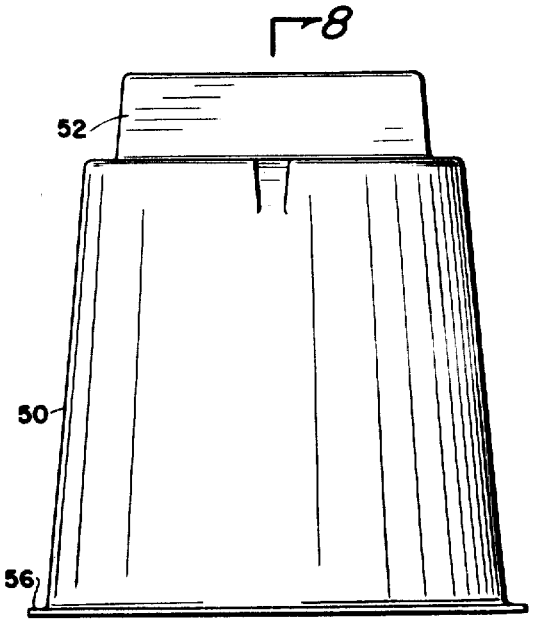
FIG. 7 is an elevational view of another embodiment of a cable vault.

Referring to FIGS. 7, 8, and 9, an alternate embodiment of the cable vault is illustrated. In this arrangement the cable vault is circular in planes taken perpendicular the vertical axis or the vault may be said to be of truncated conical configuration. The circular configuration has the advantage that it is inherently stronger than a rectangular cross-sectioned configuration, and therefore, can be more easily constructed of sufficient strength to resist collapse without the use of reinforcing bars as has been previously described with the rectangular cross-sectioned vault of FIGS. 1–5.

The circular cross-section vault of FIGS. 7, 8, and 9 includes a tapered body portion 50 and an integral upper upwardly extending collar portion 52 which preferably is of rectangular cross-section to conform with the preferred configuration of opening 22 in the transformer pad. It can be understood that this collar 52 may be of square or any other configuration as long as it is received within the opening provided in the transformer pad. Preferably, the mating of the opening in the transformer pad and the upwardly extending collar portion 52 is of a snug arrangement, that is, one which easily permits the transformer pad to be assembled down over the collar of the cable vault but which achieves a substantially continuous contact around the full exterior periphery of the vault opening.

The upwardly extending collar portion 52 has an opening 54 therein through which cables pass to be connected to the transformer above the top surface of the transformer pad. The lower end of the body 50 may include an intergral outwardly extending lip 56 as a reinforcing and anchor means.

APPLICATION OF THE INVENTION

The invention is directed to the combination of a ground mounted transformer, a transformer pad, and a cable vault. These three elements are ideally arranged for a residential and industrial subdivision in which electrical power is supplied by underground cables. In the United States and many foreign countries, it is becoming more prevalent for power companies to install electrical service underground because of the improved appearance of neighborhoods achieved by eliminating the unsightly poles, pole-mounted transformers and overhead conductors which have been most commonly employed in the past.

In a typical installation of a subdivision in which underground electrical cables are to be utilized, before constructing houses, the primary electrical distribution system is installed. Trenches are dug, and cables are laid in the ground. Where a transformer is required, in the past it has been the custom to merely extend the cables above the ground and cut them off, leaving the exposed cables above the earth's surface. This results in the possibility of damage to the cable ends and to hazard to workmen. The present invention overcomes these problems by providing a cable vault which is mounted in the earth's surface at the time the cables are installed. The cables may extend in the vault and may be curled or coiled within the vault to leave sufficient length of cable to later extend upwardly for connection to a transformer. All of the cable vault is buried beneath the earth's surface except the upwardly extending collar portion and cover which is usually surface mounted and it is not necessary that any portion of the cable normally extend above this upper end of the vault until it is time to install the transformer pad and transformer. To further protect the cables within the cable vault and to prevent the cable vault from being inadvertently filled with dirt, the removable cover 40 as previously discussed and illustrated in FIGS. 2, 3, and 4 may be attached.

When it is time to install the transformer, the workmen merely remove the cover 40 and position a transformer pad on the earth's surface with the upwardly extending collar portion 36 of the vault received within the opening in the pad. In many instances, transformers for use in underground distribution systems, are shipped from the factory with the transformer attached to the pad. The workmen open cover 16, exposing the part of the transformer where electrical connections are made. The workmen then may reach down into the interior of the vault 10 and pull the ends of the cables 18 upwardly and attach them to the transformer. While only four cables are shown, the number is usually greater as in most instances, the primary cables feeding the transformer are looped, providing two sets of feeder cables plus the secondary conductors. The cables are connected to porcelain insulators 58 or to high voltage dead front elbows extending from transformer 15. It can be seen that if cable 18 extends tautly from the earth and pad 13 is pushed upwardly by frost heave, then insulators 58 can be snapped off, interrupting power service. With the use of cable vault 10, slack can be employed in the cables 18 as they are connected, allowing for shifting of the pad and transformer.

Thus, the transformer, the transformer pad, and the cable vault become an integrated unit providing improved installation of underground electrical distribution systems with improved safety and with the decreased possibility that damage can occur to the exposed cables after they are buried underground, both before the transformer is installed and after it is connected to the underground cables.

While the invention has been described with a certain degree of particularity, it is manifest that many changes may be made in the details of construction and the arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

What is claimed is:

1. A ground level transformer unit for connection to underground cables, including:

a horizontal pad having an upper and a lower surface, the lower surface being adapted to rest upon the earth, and the upper surface adapted to receive a transformer thereon, the pad having a vertical cable opening providing means to receive underground cables therethrough; and a transformer positioned on said pad having means for connection to underground cable extending through said cable opening, the improvement comprising:

a cable vault of vertical, hollow, open-top and open-bottom construction, and of cross-sectional dimensions to receive underground cables therethrough while providing space to accept slack in the cables, the cable vault having an upper shoulder portion of dimensions less than the dimension of said pad cable opening and the shoulder portion being slidably received in said pad cable opening permitting relative vertical movement between said pad and the cable vault.

2. A transformer unit as in claim 1 including a plurality of integral horizontal ribs formed in the walls of said cable vault.

3. A transformer unit as in claim 1 including a plurality of reinforcing loops disposed within said cable vault.

4. A transformer unit according to claim 1 wherein said cable vault shoulder received within said pad opening is of sufficient vertical length so that the upper end thereof is above said pad top surface, the upper extending shoulder serving to resist tampering with cables extending through said cable vault and pad opening.

*5. A ground level transformer unit for connecting to underground cables, comprising:*

*a horizontal pad having an upper and a lower surface, the lower surface being adapted to rest upon the earth and the upper surface adapted to receive a transformer thereon, the pad having a vertical opening providing means to receive underground cables therethrough;*

*a transformer positioned on said pad having means for connection to underground cable extending through said cable opening; and*

*a cable vault of vertical, hollow, open-top and open-bottom construction, and of cross-sectional dimensions, in a plane parallel to said upper and lower surfaces, greater than said pad cable opening and less than said pad, the vault adapted for burial beneath the earth's surface and to receive underground cables therethrough while providing space to accept slack in the cables, the cable vault having an open top portion configured to communicate with said pad cable opening, the cable vault top portion being in contiguous relationship with said pad lower surface, providing a passageway for slacked underground cables to connect to said transformer.*

* * * * *